United States Patent [19]
Letemps et al.

[11] Patent Number: 5,626,642
[45] Date of Patent: May 6, 1997

[54] METHOD FOR THE PRODUCTION OF CURVED GLASS SHEETS

[75] Inventors: Bernard Letemps, Thourotte; Jacques Leclercq, Roisel, both of France

[73] Assignee: Saint-Gobain Vitrage International, Courbevoie, France

[21] Appl. No.: 526,458

[22] Filed: Sep. 11, 1995

Related U.S. Application Data

[63] Continuation of Ser. No. 237,419, May 3, 1994, abandoned, which is a continuation of Ser. No. 810,178, Dec. 19, 1991, abandoned.

[30] Foreign Application Priority Data

Dec. 21, 1990 [FR] France .................. 90 16178

[51] Int. Cl.$^6$ ............................................ C03B 23/023
[52] U.S. Cl. .................. 65/106; 65/273; 65/287; 65/291
[58] Field of Search .................... 65/106, 107, 245, 65/273, 287, 289, 290, 291

[56] References Cited

U.S. PATENT DOCUMENTS

| | | |
|---|---|---|
| 3,226,219 | 12/1965 | Jamnik .................... 65/245 |
| 3,869,269 | 3/1975 | Knapp . |
| 4,586,946 | 5/1986 | Kramer et al. ............. 65/273 |
| 4,804,397 | 2/1989 | Stas et al. ................. 65/106 |
| 4,820,327 | 4/1989 | Letemps et al. ........... 65/273 |
| 4,853,018 | 8/1989 | Koss et al. ................ 65/106 |
| 5,236,487 | 8/1993 | Letemps et al. ........... 65/106 |
| 5,368,625 | 11/1994 | Mizusugi ................... 65/289 |

FOREIGN PATENT DOCUMENTS

| | | |
|---|---|---|
| 0133113 | 2/1985 | European Pat. Off. . |
| 2221409 | 10/1974 | France . |
| 2442219 | 6/1980 | France . |
| 2604992 | 4/1988 | France . |
| 1919886 | 11/1969 | Germany . |

*Primary Examiner*—Donald E. Czaja
*Assistant Examiner*—Steven P. Griffin
*Attorney, Agent, or Firm*—Oblon, Spivak, McClelland, Maier & Neustadt, P.C.

[57] ABSTRACT

A method of and a device for curving glass sheets preheated to curving temperature operate by passage of the glass sheets simultaneously over a principal shaping bed having a longitudinal trajectory which is substantially circular or substantially a cone of revolution, and one or more secondary shaping beds, the generatrices of which are inclined relative to those of the principal bed. The invention is applicable, notably, to the production of automobile panes having angled corners.

8 Claims, 2 Drawing Sheets

METHOD FOR THE PRODUCTION OF CURVED GLASS SHEETS

This application is a continuation of application Ser. No. 08/237,419, filed on May 3, 1994, now abandoned, which is a continuation of application Ser. No. 07/810,178, filed on Dec. 19, 1991, now abandoned.

BACKGROUND OF THE INVENTION

1. Field of the Invention

This invention relates to the techniques of producing curved and possibly also thermally toughened glass sheets, notably those curved to complex, non-cylindrical shapes. More particularly, the invention concerns such techniques in which the glass sheets are caused to pass over a shaping bed composed of shaping rods, for example revolving elements, disposed along a path having a profile curved in the direction of travel of the glass sheets. The invention is applicable, for example, to the production of automobile glazing panes, for example of the fixed side window type.

2. Description of the Related Art

These curving-toughening techniques are known, for example, from French Patent 2 442 219, which proposes to preheat the glass sheets to the softening temperature, and then to cause them to travel on a conveyor continuing uninterruptedly the path followed by the glass sheet from the furnace, said conveyor forming a shaping bed passing through a final toughening zone and being constituted of revolving elements disposed along a path having a curved profile, in practice a circular profile with its concavity preferably facing upwards. In this case, the trajectory followed by the glass sheet is not plane but cylindrical, the generatrices of the cylinder being horizontal and preferably perpendicular to the direction of feed of the glass, the glass being brought flat into the installation. The radius of the cylinder to which the trajectory of the glass sheet fits corresponds to the radius of curvature imparted to the glass sheet in the direction parallel to its direction of travel.

With revolving elements composed of straight rods, a right cylinder is obtained. Other toroidal forms of revolution are obtained by substituting for the straight rods shaped rollers, for example of the handlebar type, bulging rollers associated with diabolos, or rods with contraflexure. Depending upon the curvature of the revolving elements, it is thus possible to achieve toroidal pane shapes, the radius of curvature of which varies from 1 meter to infinity for the principal curvature and from 20 meters to infinity for the secondary curvature, infinity corresponding to straight rollers and therefore to a cylindrical shape.

Although shaped rollers make possible a wide variety of pane shapes, they nevertheless have many disadvantages. Firstly, it is in practice very difficult to use them in the absence of upper counter-rollers, contrary to the case of straight rods (see EP-A-263 030). Also, now each upper counter-roller must have a shape rigorously complementary to that of the corresponding lower roller and the control of the shape of a roller is quite evidently more complicated to achieve if this shape departs from a simple straight rod mounted without contraflexure. Furthermore, they are more expensive and this cost is increased by the need for maintaining stocks. Finally, considerations of an essentially technical nature limit the minimum secondary radius of curvature to 20 meters, which is not a very pronounced curve.

The lateral panes of automobile vehicles today constitute the primary target for these curving techniques, which advantageously are carried out at very high production rates due notably to the possibility of allowing the glass sheets to follow one another at spacings of only a few centimeters between them. Moreover, these curving techniques make possible very high reproducibility of the curvature and of the optical quality of the final panes, which is especially appreciated from a industrial aspect. Nevertheless, these curving techniques cannot be used in all cases where the intended final shape has at least one fold line, following the example of those panes known as flush, of which the principal surface is tangential to the remainder of the automobile body when they have been installed in their frames. In fact, these panes of more complex shapes cannot at present be produced except by application against a curving mold and very frequently pressing against a complementary pressing against a curving frame, which of necessity requires an interruption to the passage of the glass sheets and a relatively wide spacing between them (while the first sheet is in process of being curved, the curving tool or mold is unavailable throughout the duration of curving, whereas in an installation such as that described in French Patent 2 242 219, the outer edge of a glass sheet can penetrate into the shaping zone while the rear edge of the preceding sheet is still there).

Apart from this aspect which limits the rates of production, the problem must also be faced of perfect mastery of the curvature effectively imparted during curving and of the prevention of any parasitic deformation due, for instance, to sagging of the glass under its own weight in those zones where it is not supported. These parasitic deformations generally take place during the transfer of the glass sheet from the curving station to the toughening station and they become all the more difficult to avoid as the curvature imparted to the glass sheet becomes less, which means that the glass sheet still has a great tendency to curve which is difficult to master.

This problem of parasitic curvatures is especially harmful in the case of the lateral panes equipped with raising and lowering devices, which require that the glass sheets shall have no or virtually no parasitic curvature, so that they may slide easily in the seating of the door provided for this purpose. In contrast, the curving-toughening methods on a shaping bed having a curved profile provide a very satisfactory solution to this problem of mastering the curvature, on account of the permanent support for the glass sheets provided by the rollers and the fact that the glass sheets are toughened directly after they are curved, without having to be transferred from a curving station to a toughening or quenching station.

Quite apart from this aspect of properly controlling the curvature, the techniques having a pressing frame permit much lower production rates than those achieved with the curving-toughening processes in which the glass sheets travel continuously without stopping. Finally, even though such panes can be considered as relatively complex by reason of their fold very near to an edge of the sheet, they are still nevertheless basically of cylindrical shape and therefore a curving production line intended for the production of the most complex panes would be over-dimensioned and therefore ill adapted.

It should, moreover, be noted that is it known from Patent Application FR-A-2 221 409 to curve glass in the form of strips or sheets by bringing it onto a plurality of conveying parallel rollers divided into two layers of parallel rollers, the planes containing the axes of the rollers of each layer being at an angle to each other and their intersection being perpendicular to the axes of the rollers, the apex of the angle formed by these two planes being orientated downwards. In the case of an individual glass sheet, cut to shape in advance, the sheet is brought into the curving station, the rollers of which are kept horizontal, and then when the sheet is in position the desired inclination is simultaneously given to perform the shaping.

Such a process is intended for the production of shapes having a developable surface, the rollers of each layer being disposed in a single plane. In the case of the volumes or bodies to be treated by the present invention, a principal curvature is added or, more exactly, precedes, this principal curvature being most commonly cylindrical, with the result that the shape aimed at is not developable (and this is achievable only because of the capacity of the glass to flow). Furthermore, this principal curvature greatly stiffens the glass body, which means that it becomes very difficult to fold it transversely to the line of principal curvature.

Moreover, in the process described in the Patent Application FR-A-2 221 409, the curvature depends very much upon the temperature acquired by the glass. It is well known that this temperature may—for various reasons—vary in the course of time by several degrees, which leads to a certain inaccuracy in the shapes obtained, an inaccuracy which must be compensated by passage between a pair of calibrating curved rollers which pinch the glass sheet. During this complementary curving between these calibrating rollers, the glass continues to cool with the result that it becomes difficult to toughen it thermally, unless it is overheated in the furnace, which has a harmful effect upon the optical quality.

SUMMARY OF THE INVENTION

An object of the present invention is to widen the range of pane shapes which can be produced industrially in a curving-toughening installation operating by passage of the glass sheets over a shaping bed defining a trajectory having a profile curved in the direction of travel of the glass.

According to the invention, this object is achieved by causing the glass sheets preheated to curving temperature to travel simultaneously over a principal shaping bed, the longitudinal trajectory of which is substantially circular or substantially a cone of revolution, and one or two secondary shaping beds, the generatrices of which are inclined with respect to those of the principal bed. The glass sheet thus has its principal part, notably its central part, shaped in accordance with the principal bed, while at least one of its edges undergoes a different trajectory, dictated by a secondary shaping bed.

The paths of the revolving elements defining the two types of shaping beds are identical, as viewed in the direction of travel of the glass sheet. Depending upon the case, these paths may be curved (the principal part of the glass sheet acquires a cylindrical shape) or may be substantially a cone of revolution, following in this respect the teaching of European Patent Application 91/402238.9, filed on 13 Aug. 1991 in the name of the Applicant.

The principal shaping bed preferably fits a trajectory tangential to the plane trajectory of the glass sheets through the reheating furnace, in order to avoid any interruption which could result in a deformation along a line essentially parallel to the front edge of the glass sheet. The secondary shaping bed or beds are, in contrast, raised so that the glass sheet will finally have angled edges (the pattern obtained with a rectilinear shaping bed as viewed in a direction perpendicular to the direction of travel of the glass sheets, the shaping elements of the secondary beds in this case being of the straight roller type), or have rounded edges (the pattern obtained with a curved shaping bed as viewed in a direction perpendicular to the direction of travel of the glass sheets, the shaping elements of the secondary beds in this case being curved).

The invention also has as an object a curving machine comprising a principal shaping bed, the longitudinal trajectory of which is substantially circular or substantially a cone of revolution, and one or two secondary shaping beds, the shaping rods of which are constituted of revolving elements penetrating between the shaping rods of the principal shaping bed and are inclined with respect to the latter.

In the great majority of cases, the secondary shaping beds must comprise two series of revolving elements, between which the glass sheets pass, this configuration making possible good compliance with the localization of the fold and/or a rounded bend which corresponds exactly to that desired, even though the temperature of the glass may vary.

BRIEF DESCRIPTION OF THE DRAWINGS

Other details and advantageous characteristics of the invention will become apparent from the detailed description given below, with reference to the attached drawings, in which.

DETAILED DESCRIPTION OF THE PREFERRED EMBODIMENTS

Figure 1:
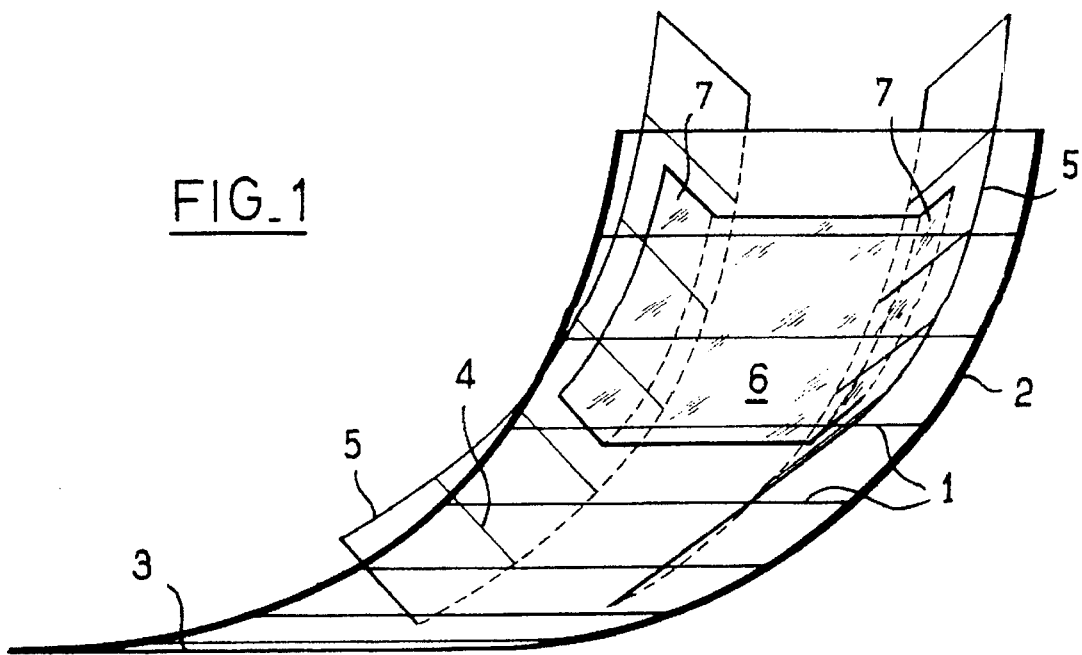
FIG. 1 is a perspective schematic view of a curving machine designed for the production of essentially cylindrical panes with straight sharp corners.

FIG. 1 illustrates the principle of the method of curving according to this invention, applied in the present case to a curving machine comprising a principal shaping bed, of which the shaping rods 1, preferably of the straight cylindrical roller type, are disposed along a profile 2 which is circular in the direction of travel of the glass sheets. The concavity of the bed is upwards. The curving machine is disposed immediately downstream of a plane feed conveyor 3 for the glass sheets heated to curving temperature; to prevent optical deformations which would result from an interruption in the path followed by the glass sheets, the curve of the principal shaping bed is tangential to this conveyor 3, which, on account of the perspective representation, appears simply in the form of a single straight line.

As indicated in the Patent FR-A-2 604 992, if the glass sheets travel at a high speed at least equal to 10 cm/s and preferably of the order of 15 to 18 cm/s, they will acquire the profile corresponding to the shaping bed under the combined effect of gravity and inertia, without assistance of upper holding means, for example of the roller type. For glass sheets of 3 mm thickness, the rollers 1 are typically spaced at 50 to 100 mm. In the present case, the glass sheets will thus acquire principally a cylindrical profile.

To this principal bed are added two secondary shaping beds placed at the sides, the shaping rods 4 of which are fitted in between adjacent pairs of the rollers 1 of the principal bed. These shaping rods are disposed along a circular profile 5 similar to the circular profile 2, but inclined relative to the principal bed with the result that the glass sheet 6 has its edges 7 raised, which leads to glass bodies of the type known as having sharp or angled corners.

Figure 2:
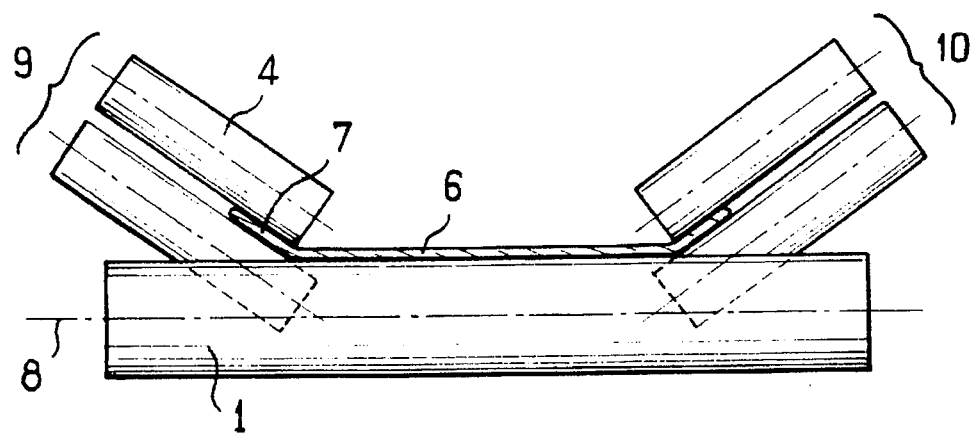
FIG. 2 is a front view of a curving machine having a plane principal bed and two straight secondary beds.

The relative arrangement of the shaping rods 4 and the rollers 1 can be seen more readily from FIG. 2, which corresponds to a front view of a curving machine, the principal shaping bed of which is plane, or more generally to a base element of a machine such as that shown in FIG. 1. In this FIG. 2, the straight cylindrical roller 1 and its axis of rotation 8 have been shown, together with, in a rear plane, two pairs 9, 10 of straight cylindrical rollers each forming part of a secondary shaping bed. The rollers of each pair are inclined to the axis 8 at an angle which may range from near 0° to 90° and of the order of 5° to 10° for the case of an automobile pane intended to be mounted flush.

In view of the steep slope in the illustrated embodiment, the upper rollers of each pair 9 or 10 are driven to assist in advancing the glass sheets. If the raised area of the glass sheet is relatively small and/or if its desired angle is very small, for example of the order of 5°, the secondary beds 9, 10 may have a constant angle of slope, the driving by the principal bed being sufficient to force the advance through the first pairs of rollers. Otherwise, it is preferable to angle the secondary bed with a certain degree of progressiveness, the angle of inclination increasing, for example, in the first three pairs.

The curving machine of FIG. 1 comprises, in its downstream part, means for gentle and controlled cooling of the curved glass sheets. In a known manner, it may also be equipped with a thermal toughening zone. For this purpose, cold air blowing nozzles are disposed between the shaping rods of the principal bed in the downstream part of the path followed by the glass sheet. According to a first variant of this invention, these nozzles are disposed across the entire width of the curving machine and the secondary beds no longer support the glass sheet once this sheet has entered the toughening zone. According to a second variant of the invention, a first series of nozzles is disposed just opposite the central part of the glass sheet, so that the toughening or quenching air, in escaping over the sides, also commences to cool the raised edges of the glass sheet—a cooling which will be all the more intense as the angle of inclination is large and these edges consequently oppose the escape of the air. This first series of toughening nozzles is complemented by a second series of nozzles, this time extending across the entire width of the curving machine, and therefore replacing the elements of the secondary shaping beds. This second variant of the invention is more especially preferred because the edges of the glass sheet enter the toughening zone slightly stiffened and for this reason have a lesser tendency to open out.

Figure 3:
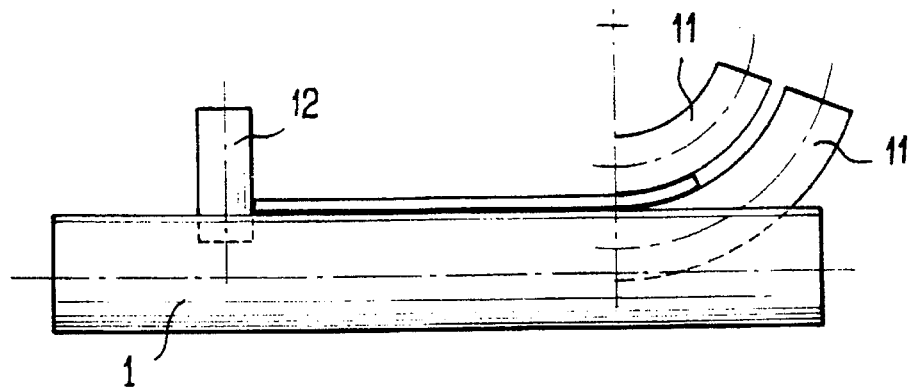
FIG. 3 is a front view of a curving machine having a plane principal bed and one secondary bed with curved revolving elements.

In the examples shown schematically in FIGS. 1 and 2, the secondary shaping beds are plane. However, the shaping rods 4 may also be composed of longitudinally curved elements such as those shown at 11 in FIG. 3. It is possible to use for this purpose curved rods, onto which series of rings are threaded, the rings being enclosed in a rotationally driven sheath. It is also possible to use shaped elements composed of straight rods, onto which rings are threaded which define a shaping surface analogous to shaped rollers of the diabolo or spindle type, but which drive the glass sheet in a constant manner.

Figure 4:
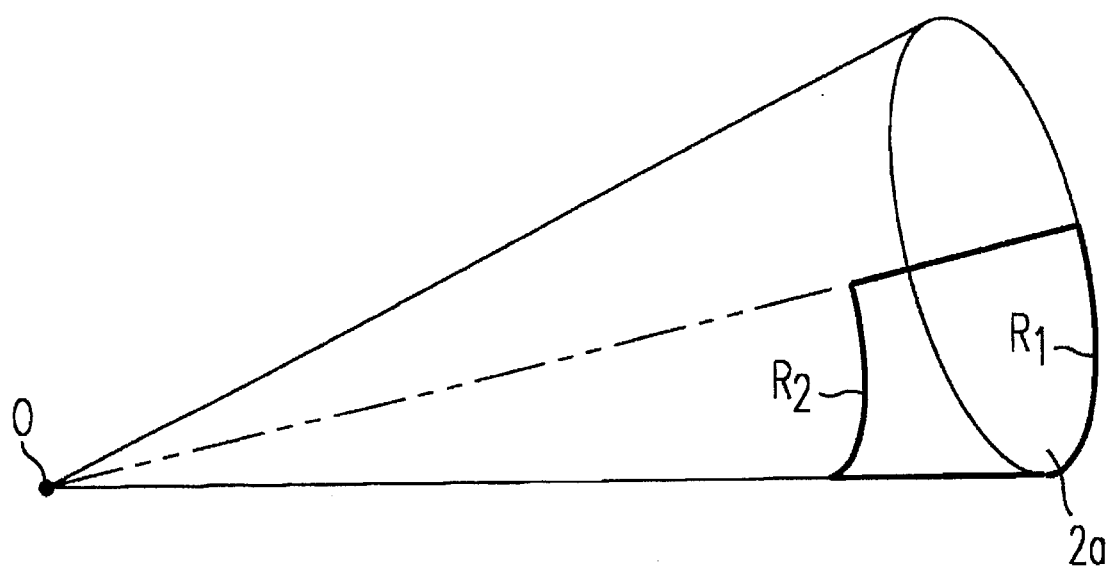
FIG. 4 is a schematic representation of a conical principal shaping bed.

While the principal shaping bed profile 2 is circular in FIG. 1, it may instead be conical as in European Patent Application 91/402238.9. This is shown in FIG. 4 where the conical bed profile 2a lies on a cone having a center O, and has radii R1 and R2.

Finally, the pane may have only a single raised edge. In this case, the asymmetric character of the forces which act on the glass sheet must be compensated by stops, constituted for example of rollers 12 mounted at 90° so as to guide the glass sheet along the desired direction of travel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method of curving glass sheets preheated to curving temperature, comprising the steps of:

a first step of passing the glass sheets over a curved principal shaping bed located outside of a furnace and having a substantially circular longitudinal trajectory so as to produce a principal curvature; and simultaneously with said first step, a second step of producing a secondary curvature by passing the glass sheets between, and in contact with, two series of revolving elements forming at least one secondary shaping bed, the generatrix of which is inclined relative to that of the principal bed and intersects said principal bed.

2. Method of curving glass sheets according to claim 1, including the step of discharging the glass sheets from a reheating surface, wherein the principal shaping bed is tangential to a plane trajectory of the glass sheets through the reheating surface.

3. Method of curving glass sheets according to claim 1, wherein said at least one secondary shaping bed is rectilinear as viewed in a direction perpendicular to the direction of travel of the glass sheets.

4. Method of curving glass sheets according to claim 1, wherein said at least one secondary shaping bed is curvilinear as viewed in a direction perpendicular to the direction of travel of the glass sheets.

5. Method of curving glass sheets according to claim 1, including the step of thermally toughening the glass sheets.

6. Method of curving glass sheets according to claim 1, including the step of cooling the glass sheets in a gentle and controlled manner.

7. Method of curving glass sheets preheated to curving temperature, comprising the steps of:

a first step of passing the glass sheets over a curved principal shaping bed having a substantially conical longitudinal trajectory so as to produce a principal curvature; and simultaneously with said first step, a second step of producing a secondary curvature by passing the glass sheets over at least one secondary shaping bed, the generatrix of which is inclined relative to that of the principal bed and intersects said principal bed.

8. The method of claim 7, wherein said second step comprises passing the glass sheets between, and in contact with, two series of revolving elements forming the at least one secondary shaping bed.

* * * * *